(12) United States Patent
Forster (10) Patent No.: US 7,158,033 B2
(45) Date of Patent: Jan. 2, 2007

(54) RFID DEVICE WITH COMBINED REACTIVE COUPLER

(75) Inventor: Ian J. Forster, Chelmsford (GB)

(73) Assignee: Avery Dennison Corporation, Pasadena, CA (US)

( * ) Notice: Subject to any disclaimer, the term of this patent is extended or adjusted under 35 U.S.C. 154(b) by 210 days.

(21) Appl. No.: 10/931,618

(22) Filed: Sep. 1, 2004

(65) Prior Publication Data

US 2006/0043198 A1 Mar. 2, 2006

(51) Int. Cl.
*G08B 13/14* (2006.01)

(52) U.S. Cl. ............................ 340/572.1; 340/572.7

(58) Field of Classification Search ............ 340/572.1, 340/572.5–572.7; 455/73; 343/850, 856; 235/492; 361/728
See application file for complete search history.

(56) References Cited

U.S. PATENT DOCUMENTS

| | | | |
|---|---|---|---|
| 5,594,233 A | | 1/1997 | Kenneth et al. |
| 5,603,307 A | * | 2/1997 | Morita et al. ............... 123/633 |
| 6,107,920 A | | 8/2000 | Eberhardt et al. |
| 6,173,899 B1 | * | 1/2001 | Rozin ......................... 235/492 |
| 6,206,292 B1 | | 3/2001 | Robertz et al. |
| 6,262,692 B1 | | 7/2001 | Babb |
| 6,378,774 B1 | | 4/2002 | Emori et al. |
| 6,606,247 B1 | | 8/2003 | Credelle et al. |
| 6,703,935 B1 | | 3/2004 | Chung et al. |
| 6,796,508 B1 | | 9/2004 | Muller |
| 6,837,438 B1 | * | 1/2005 | Takasugi et al. ............ 235/492 |
| 6,861,993 B1 | | 3/2005 | Waldner |
| 2001/0053675 A1 | | 12/2001 | Plettner |
| 2004/0069856 A1 | | 4/2004 | Hold et al. |
| 2004/0178267 A1 | | 9/2004 | Tsirline et al. |
| 2005/0124300 A1 | * | 6/2005 | Khorram ...................... 455/78 |

FOREIGN PATENT DOCUMENTS

| | | |
|---|---|---|
| DE | 195 00 925 | 7/1996 |
| DE | 101 33 588 | 7/2001 |
| EP | 0826190 A1 | 4/1998 |
| EP | 0977145 A | 2/2000 |
| EP | 1 039 543 | 3/2000 |
| EP | 1 130 556 | 1/2001 |
| EP | 1 420 477 | 11/2002 |
| FR | 2781588 A | 1/2000 |
| JP | 2004120330 | 9/2002 |
| JP | 2002308437 | 10/2002 |
| JP | 2004206479 | 12/2002 |
| JP | 2004242245 | 2/2003 |
| JP | 2004126750 | 4/2004 |
| NL | 9100176 A | 3/1992 |
| WO | WO98/40930 | 9/1998 |
| WO | WO 02/099764 | 12/2002 |
| WO | WO 2004/097725 | 3/2004 |
| WO | 2004/030148 | 8/2004 |

OTHER PUBLICATIONS

Claims from U.S. Appl. No. 10/931,863, filed Sep. 1, 2004.
Lee, Youbok; Antenna Circuit Design for RFID Applications. AN710. 2003 Microchip Technology Inc. DS00710C.

* cited by examiner

*Primary Examiner*—Thomas Mullen
(74) *Attorney, Agent, or Firm*—Renner, Otto, Boisselle & Sklar, LLP (57) ABSTRACT

An RFID device, such as an RFID tag or label, includes a combined reactive coupler electrically coupling a transponder chip to an antenna. The combined reactive coupler includes a magnetic coupler and a capacitive coupler. The magnetic coupler and the reactive coupler may have respective coupling elements on both the interposer and on an antenna substrate.

35 Claims, 5 Drawing Sheets

RFID DEVICE WITH COMBINED REACTIVE COUPLER

BACKGROUND OF THE INVENTION

1. Field of the Invention

This invention relates to the field of radio frequency identification (RFID) tags and labels.

2. Description of the Related Art

RFID tags and labels have a combination of antennas and analog and/or digital electronics, which may include for example communications electronics, data memory, and control logic. RFID tags and labels are widely used to associate an object with an identification code. For example, RFID tags are used in conjunction with security-locks in cars, for access control to buildings, and for tracking inventory and parcels. Some examples of RFID tags and labels appear in U.S. Pat. Nos. 6,107,920, 6,206,292, and 6,262,292, all of which this application incorporates by reference.

RFID tags and labels include active tags, which include a power source, and passive tags and labels, which do not. In the case of passive tags, in order to retrieve the information from the chip, a "base station" or "reader" sends an excitation signal to the RFID tag or label. The excitation signal energizes the tag or label, and the RFID circuitry transmits the stored information back to the reader. The "reader" receives and decodes the information from the RFID tag. In general, RFID tags can retain and transmit enough information to uniquely identify individuals, packages, inventory and the like. RFID tags and labels also can be characterized as to those to which information is written only once (although the information may be read repeatedly), and those to which information may be written during use. For example, RFID tags may store environmental data (that may be detected by an associated sensor), logistical histories, state data, etc.

Still other RFID devices and methods for manufacturing RFID labels are disclosed in U.S. Patent Application Publication No. US2001/0053675 by Plettner, which is incorporated herein by reference in its entirety. The devices include a transponder comprising a chip having contact pads and at least two coupling elements, which are conductively connected with the contact pads. The coupling elements are touch-free relative to each other and formed in a self-supported as well as a free-standing way and are essentially extended parallel to the chip plane. The total mounting height of the transponder corresponds essentially to the mounting height of the chip. The size and geometry of the coupling elements are adapted for acting as a dipole antenna or in conjunction with an evaluation unit as a plate capacitor. Typically, the transponders are produced at the wafer level. The coupling elements can be contacted with the contact pads of the chip directly at the wafer level, i.e., before the chips are extracted from the grouping given by the wafer.

In many applications, it is desirable to reduce the size of the electronics as small as possible. In order to interconnect very small chips with antennas in RFID inlets, it is known to use a structure variously called "interposers", "straps", and "carriers" to facilitate inlay manufacture. Interposers include conductive leads or pads that are electrically coupled to the contact pads of the chips for coupling to the antennas. These pads provide a larger effective electrical contact area than ICs precisely aligned for direct placement without an interposer. The larger area reduces the accuracy required for placement of ICs during manufacture while still providing effective electrical connection. IC placement and mounting are serious limitations for high-speed manufacture. The prior art discloses a variety of RFID interposer or strap structures, typically using a flexible substrate that carries the interposer's contact pads or leads.

One type of prior art RFID inlet manufacture using interposers is disclosed in European Patent Application EP 1039543 A2 to Morgan Adhesives Company ("Morgan"). This patent application discloses a method of mounting an integrated circuit chip (IC) using an interposer connected across a gap between two thin conductive film sections of a conductive film antenna. The interposer comprises a thin substrate having two printed conductive ink pads. This method is said to be suitable for mass production of radio frequency identification tags (RFIDs) by mounting ICs on interposers that are then physically and electrically connected to the antenna sections using a pressure sensitive conductive adhesive. The pressure sensitive conductive adhesive provides a direct electrical connection between the interposer contact pads and the antenna sections.

Another type of prior art RFID inlet manufacture using interposers is based on a technique for manufacturing microelectronic elements as small electronic blocks, associated with Alien Technology Corporation ("Alien") of Morgan Hill California. Alien has developed techniques to manufacture small electronic blocks, which it calls "NanoBlocks", and then deposit the small electronic blocks into recesses on an underlying substrate. To receive the small electronic blocks, a planar substrate 200 (FIG. 1) is embossed with numerous receptor wells 210. The receptor wells 210 are typically formed in a pattern on the substrate. For instance, in FIG. 1 the receptor wells 210 form a simple matrix pattern that may extend over only a predefined portion of the substrate, or may extend across substantially the entire width and length of the substrate, as desired. Alien has a number of patents on its technique, including U.S. Pat. Nos. 5,783,856; 5,824,186; 5,904,545; 5,545,291; 6,274,508; and 6,281,038, all of which the present application incorporates by reference. Further information can be found in Alien's Patent Cooperation Treaty publications, including WO 00/49421; WO 00/49658; WO 00/55915; WO 00/55916; WO 00/46854 and WO 01/33621, all of which this application incorporates by reference in their entireties.

Alien's NanoBlock technology is adapted to interposer manufacture for producing RFID inlets in U.S. Pat. No. 6,606,247. A carrier substrate or interposer is coupled to an IC that is recessed below a surface of the interposer. The interposer further includes first and second carrier connection pads that interconnect with the IC using metal connectors. A planar antenna substrate carries first antenna sections with respective first and second receiving connection pads. The carrier substrate is coupled to the antenna substrate using the carrier connection pads and receiving connection pads. In contrast to the interposer of Morgan's European publication EP 1039543 A2 in which the IC is mounted above the interposer contact pads at the surface of the interposer substrate, in U.S. Pat. No. 6,606,247 the chips are retained in recesses in the interposer substrate, and the carrier connection pads are formed above the IC. However, both EP 1 039 543 A2 and U.S. Pat. No. 6,606,247 share the feature that the interposer or strap pads are directly electrically connected to the antenna sections using conductive adhesive.

Another problem to be solved in producing inlays using interposers is the reliable high speed mechanical and electrical coupling of the interposers (and interposer leads) to antennas. The present invention, in contrast to Morgan's EP 1 039 543 A2 and Alien's U.S. Pat. No. 6,606,247, uses a non-conductive adhesive to mechanically couple the interposer leads to the antenna sections. Non-conductive adhesives can facilitate high speed production in comparison to conductive adhesives, due to reduction of cure time requirements and production cycle times. However, since the adhesive is not electrically conductive, another mechanism (besides electrical conduction by the adhesive) must be provided to electrically couple the interposer leads to the antenna sections.

From the foregoing it will be seen that room exists for improvements in RFID tags and methods of assembling such tags.

SUMMARY OF THE INVENTION

According to an aspect of the invention, a transponder chip of an RFID device is both capacitively and magnetically coupled to an antenna of the RFID device.

According to another aspect of the invention, an RFID device includes an interposer having a transponder chip, and an antenna. The transponder chip and the antenna are both capacitively and magnetically coupled together. The magnetic coupling is accomplished by a magnetic coupler and the capacitive coupling is accomplished by a capacitive coupler. According to an embodiment of the invention, the magnetic coupler includes magnetic coupling elements that are electrically coupled to the transponder chip and the antenna, respectively. According to another embodiment of the invention, the capacitive coupler includes pairs of capacitive coupling elements that are electrically coupled to the transponder chip and the antenna, respectively.

According to a further aspect of the invention, an RFID device includes: a pair of components; and a combined reactive coupler electrically coupling together the components. The combined reactive coupler includes: magnetic coupler; and a capacitive coupler.

According to a still further aspect of the invention, an RFID device includes: an antenna portion that includes an antenna substrate, and an antenna on the antenna substrate; an interposer mechanically coupled to the antenna portion, wherein the interposer includes a transponder chip; and a combined reactive coupler electrically coupling together the antenna and the transponder chip. The combined reactive coupler includes: a magnetic coupler; and a capacitive coupler. The magnetic coupler includes: an antenna portion magnetic coupling element electrically coupled to the antenna; and an interposer magnetic coupling element electrically coupled to the chip. The capacitive coupler includes: an antenna portion pair of capacitive coupling elements that are electrically coupled to the antenna; an interposer pair of capacitive coupling elements that are electrically coupled to the transponder chip; and a dielectric material between the pairs of capacitive coupling elements.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

In the annexed drawings, which are not necessarily according to scale.

DETAILED DESCRIPTION

An RFID device, such as an RFID tag or label, includes both a magnetic coupler and a capacitive coupler coupling together operative portions of an interposer or strap, and an antenna. The interposer or strap includes a transponder chip, an interposer magnetic coupling element that is operatively coupled to the transponder, and one or more interposer capacitive coupling elements that are operatively coupled to the transponder. An antenna portion magnetic coupling element and a pair of antenna portion capacitive coupling elements are operatively coupled to the antenna. The magnetic coupling elements together constitute a magnetic coupler that is used to magnetically couple the transponder chip of the interposer to the RFID antenna. The interposer capacitive coupling elements are operatively coupled to the antenna portion capacitive coupling elements, thereby constituting a capacitive coupler. A high permeability material may be used to enhance the magnetic coupling between the magnetic coupling elements, and a dielectric material may be placed between the pairs of capacitive coupling elements to enhance the capacitive coupling.

The magnetic coupling elements may be conductive loops. The conductive loops may be single-turn conductive loops. Alternatively, one or both of the conductive loops may have multiple turns, thus being conductive coils. The use of multiple-turn conductive loops or coils allows the magnetic coupler to function as a transformer, with the voltage across the antenna transformed to a different voltage across the transponder chip, and vice versa. The magnetic coupler may have other advantageous characteristics in addition to enabling transformation of voltage, such as protecting the transponder chip against static discharge, or allowing the RFID device to operate in a strong electromagnetic environment.

The capacitive coupling elements may be substantially flat areas of conductive materials, large enough to capacitively couple together across an intervening dielectric material. The capacitive coupling elements and/or the intervening material may be selected to achieve desired characteristics of the capacitive coupler. For instance, the higher the dielectric constant of the intervening material, the stronger the capacitive coupling. In addition, the capacitive coupling elements and/or the dielectric material may be configured to compensate to at least some degree for changes in thickness of the dielectric material or misalignments of the capacitive coupling elements.

Coupling the transponder chip and the antenna by two different coupling methods (magnetic and capacitive) may lead to advantageous characteristics for the RFID device. The different coupling mechanisms may provide a more robust coupling, in that changes in characteristics of one of the couplings may be offset or minimized by different behavior of the other coupling mechanism. Thus an RFID device with both coupling mechanisms may provide suitable performance in a wider variety of conditions (e.g., differences in types of objects in close proximity, differences in misalignment, and/or differences in incident signals) than devices with only a single coupling mechanism.

Figure 1:
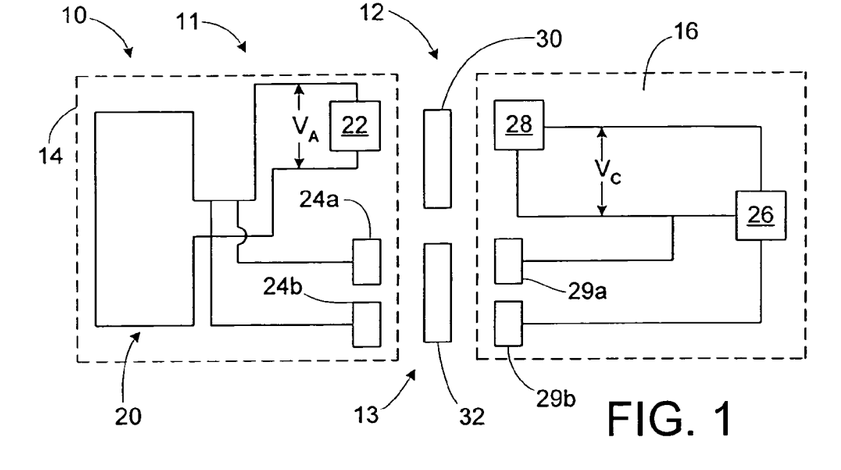
FIG. 1 is a schematic diagram of an RFID device in accordance with the present invention.
Figure 2:
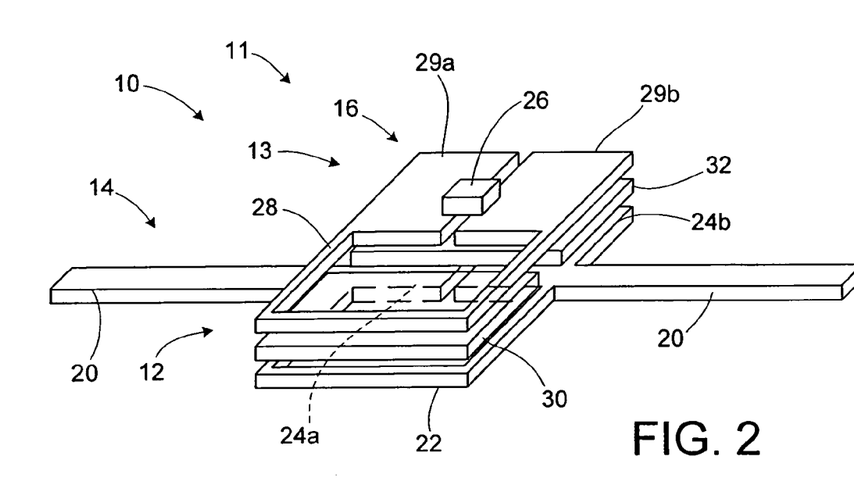
FIG. 2 is an exploded oblique view showing operative parts of the RFID device of FIG. 1.

FIGS. 1 and 2 show an RFID device 10 that includes a combined reactive coupler 11, which in turn includes both a magnetic coupler 12 and a capacitive coupler 13, that operatively couples together an antenna portion 14 and an interposer 16. The antenna portion 14 includes an antenna 20, an antenna portion magnetic coupling element 22, and antenna portion capacitive coupling elements 24a and 24b. The antenna 20 is electrically coupled to both the magnetic coupling element 22, and the capacitive coupling elements 24a and 24b. The electrical coupling between the antenna 20 and the antenna portion magnetic coupling element 22 may be a direct electrical (conductive) coupling, or may be a non-direct reactive coupling, such as capacitive coupling. Likewise, the electrical coupling between the antenna 20 and the antenna portion capacitive coupling elements 24a and 24b may be a direct electrical coupling, or may be a non-direct reactive coupling, such as capacitive coupling. The antenna 20 may be any of a variety of suitable antennas for receiving and/or sending signals in interaction with an RFID communication device such as a reader.

The interposer 16 includes a transponder chip 26, an interposer magnetic coupling element 28 that is electrically coupled to the transponder chip 26, and interposer capacitive coupling elements 29a and 29b. The couplings between the transponder chip 26 and both the interposer magnetic coupling element 28 and the capacitive coupling elements 29a and 29b, may involve direct electrical contact, and/or may include certain types of reactive coupling, such as capacitive coupling.

The transponder chip 26 may include any of a variety of suitable electrical components, such as resistors, capacitors, inductors, batteries, memory devices, and processors, for providing suitable interaction, through the antenna 20 (FIG. 1), with an external device. It will be appreciated that a large variety of transponder chips for RFID devices are widely known. The term "transponder chip" is intended to encompass the broad range of such devices, which may vary widely in complexity and functionality.

The magnetic coupling elements 22 and 28 together constitute the magnetic coupler 12. The interaction of the magnetic coupling elements 22 and 28 allows transfer of energy between the antenna 20 and the transponder chip 26, via magnetic coupling. Magnetic coupling, as the term is used herein, refers to short-range transfer of energy by interaction of magnetic fields.

The pairs of capacitive coupling elements 24a/24b and 29a/29b together constitute the capacitive coupler 13. As explained further below, the antenna portion capacitive coupling elements 24a and 24b may be aligned with the interposer capacitive coupling elements 29a and 29b, with a dielectric material therebetween, to provide another mechanism for coupling together the antenna 20 and the transponder chip 26.

Magnetic coupling and/or capacitive coupling are referred to collectively herein as "reactive coupling," in contrast to direct electrical coupling by electrically conductive material. References herein to magnetic, capacitive, or reactive coupling refer to coupling that is predominantly or primarily magnetic, capacitive, or reactive. It will be appreciated that coupling that is primarily magnetic may also include some capacitive coupling. Conversely, coupling that is primarily capacitive may also include some inductive (magnetic) coupling as a secondary coupling mechanism. Systems using primarily capacitive or magnetic coupling are referred to herein as utilizing reactive coupling. Capacitive, magnetic, or reactive coupling, as the terms are used herein, may also include some direct conductive coupling, albeit not as the primary type of electrical coupling.

The RFID device 10 of FIGS. 1 and 2 utilizes a combined reactive coupler 11 that involves significant coupling between the antenna 20 and the transponder chip 26 from both capacitive (electric field) and magnetic coupling mechanisms. As referred to herein, a combined reactive coupler is a coupler that couples by primarily reactive mechanisms (in contrast to direct electrical coupling), and has at least 10% of its energy transfer provided by each of magnetic coupling and capacitive coupling. Either magnetic coupling or capacitive coupling may be the predominant mechanism for a reactive coupler.

The magnetic coupler 12 relies on short-range coupling within the RFID device 10 to transmit energy and/or signals between the antenna 20 and transponder chip 26. In contrast, primarily the antenna 20 is relied upon for long-range far-field RF coupling to devices outside the RFID device 10. The far field, as used herein, refers to a distance greater than on the order of 15 mm from an RF-energy emitting device, such as device that emits UHF RF energy. Coupling of an RFID device in the far field is also referred to as "long-range coupling." The near field, where short-range coupling may occur, is defined as within on the order 15 mm from an RF-energy emitting device. A more precise boundary of between the near field and the far field may be $\lambda/2\pi$, where $\lambda$ is the wavelength of the RF energy of the RF coupling. For RF of energy of 915 MHz, the boundary between the near field and the far field would be about 52 mm from the device, using this definition.

The magnetic coupling elements 22 and 28 may be such that any dimension of them is less than about one-tenth of a wavelength of the energy of signals being transmitted and received by the RFID device 10. Thus the magnetic coupling elements, by their size alone, may be unsuitable for long-range coupling.

As discussed further below, the magnetic coupling elements 22 and 28 may each include one or more conductive loops, that is, one or more loops of electrically-conductive material substantially surrounding non-conductive material. The coupling elements 22 and 28 may have the same number of turns of conductive material. Alternatively, the coupling elements 22 and 28 may have a different number of turns of conductive material. When the coupling elements 22 and 28 have different numbers of turns of conductive material, the voltage $V_A$ across the antenna 20 may in general be different than the voltage $V_C$ across the transponder chip 26. That is, with different numbers of turns in the two coupling elements 22 and 28, the magnetic coupler 12 may act as a transformer. In general, depending on the number of conductive turns in the respective coupling elements 22 and 28, the voltage $V_A$ of the antenna 20 may be greater than, less than, or substantially the same as the voltage $V_C$ across the transponder chip 26. Transforming the voltage across the magnetic coupler 12 may be beneficial in operation of the RFID device 10. For instance, in many RFID devices the rectifiers will not put out a voltage greater than peak-to-peak voltage of the applied input RF signal. By multiplying the voltage/impedance presented to the transponder chip 26, the operating range of the RFID device 10 may potentially be increased. This method of increasing the voltage $V_C$ across the transponder chip 26 may be superior to other prior methods of increasing the voltage across a transponder chip. Such prior methods include use of a voltage multiplier circuit to increase the voltage across the transponder chip or a portion thereof, and increasing the impedance of an antenna. Inclusion of a voltage multiplier circuit or charge pump increases complexity, and may result in only a minor increase in voltage, on the order of 0.8 volts. Increasing the impedance of the antenna also has practical limitations, as there is a limit to how high the impedance of the antenna may be set without adversely affecting the efficiency of the antenna.

Referring again to FIGS. 1 and 2, a high permeability material 30 may be placed in proximity to the magnetic coupling elements 22 and 28. Ferrites are an example of suitable materials for the high permeability material 30. Ferrites are ceramic materials, generally containing iron oxide combined with binder compounds such as nickel, manganese, zinc, or magnesium. Two major categories of binder compounds are manganese zinc (MnZn) and nickel zinc (NiZn). The high permeability material 30 may be placed between the magnetic coupling elements 22 and 28, or elsewhere in proximity to the magnetic coupling elements 22 and 28. The high permeability material 30 may be used to increase and/or concentrate magnetic coupling between the magnetic coupling elements 22 and 28. The high permeability material 30 may increase the amount of flux transferred between the magnetic coupling elements 22 and 28. The high permeability material 30 may be in the form of any of a variety of layers or structures in proximity to the magnetic coupling portions or elements 22 and 28. For example, the high permeability material may be a coating on or in proximity to either or both of the magnetic coupling elements 22 and 28. One possibility for such a coating is ferrite particles contained in an organic binder, such as a pressure sensitive adhesive. Another possibility is ferrite particles (on the order of tens of nanometers to microns) in ink jet printable water-based inks. Alternatively, the high permeability material 30 may be incorporated into the substrate of either or both the interposer 16 and the antenna portion 14, for example by being added in powder form as the substrate is formed. As a further alternative, the high permeability material 30, such as ferrite particles, may be incorporated into an adhesive or other bonding layer that is used to attach the interposer 16 to the antenna portion 14. Making the high permeability material 30 as part of the structure of the interposer 16, or as part of the mechanical coupling between the interposer 16 and the antenna portion 14, may advantageously concentrate the magnetic flux into the interposer 16 even when the interposer 16 is not optimally positioned. That is, the high permeability material 30 may aid in magnetic coupling of the magnetic coupling elements 22 and 28 even when the magnetic coupling elements 22 and 28 are not optimally positioned relative to one another. This may make the RFID device 10 tolerant to a large range of less-than-optimal relative positions of the interposer 16 and the antenna portion 14. It will be appreciated that this tolerance to mis-positioning of the interposer 16 may lead to reduced cost and/or improved performance in any of a number of ways. For example, it may be possible to use less costly methods of placing the interposer 16, with a greater acceptable range of placement positions. In addition, rejection rates may be reduced and/or performance of the RFID device 10 may be improved, due to the presence of the high permeability material 30.

Another potential advantage of the high permeability material 30 is that it may prevent damage to the transponder chip 26 by effectively de-tuning the RFID device 10 when a strong input signal is received by the antenna 20. As background, it is commonly appreciated that it is desirable for the antenna and the transponder chip to be optimally "tuned" such that the impedance of the two are complex conjugates of each other (substantially equal resistance and opposite reactance). In general, the characteristics of the magnetic coupler 12 may be taken into account in properly tuning the RFID device 10 so as to match resistance and impedance between the antenna 20 and the transponder chip 26. The presence of the high permeability material 30 may limit the amount of energy that may be transferred through the magnetic coupler 12 from the antenna 20 to the transponder chip 26. This is because an extremely strong signal incident on the antenna 20 may cause a change in permeability of the high permeability material 30. This change in permeability may effectively de-tune the magnetic coupler 12, reducing its efficiency by inhibiting energy transfer across the magnetic coupler 12. The result may be a mechanism that advantageously prevents overloading of the transponder chip 26. It will be appreciated that it is desirable to prevent overload of the transponder chip 26 since such overloading may cause damage to or failure of the transponder chip 26, leading to adverse effects upon the performance of the RFID device 10. It will be appreciated that this feature of the magnetic coupler 12, the ability to effectively self-de-tune to prevent overload of the transponder chip 26, may be a more general advantage of magnetic couplers 12, even those without a specifically-added high permeability material 30 in proximity to the magnetic coupling elements 22 and 28.

The magnetic coupler 12 may be configured such that the effective induction presented to the transponder chip 26 by the magnetic coupling element 28 is such that the induction is equal and opposite to the capacitance of the transponder chip 26. Such an arrangement results in a resonant structure consisting of the antenna 20, the magnetic coupler 12, and the transponder chip 26. Such a resonant structure arrangement allows for more efficient and more effective transfer of energy between the antenna 20 and the transponder chip 26.

The capacitive coupler 13 may include a dielectric material 32 that may prevent direct conductive contact between the antenna portion capacitive coupling elements 24a and 24b, and the interposer capacitive coupling elements 29a and 29b. The dielectric material 32 may be configured so as to provide suitable, repeatable capacitive coupling between the antenna portion capacitive coupling elements 24a and 24b, and the interposer capacitive coupling elements 29a and 29b. The dielectric material 32 may be printed or otherwise placed on either the antenna portion capacitive coupling elements 24a and 24b, or the interposer capacitive coupling elements 29a and 29b. As another alternative, the dielectric material 32 may be or may include substrates of either or both of the antenna portion 14 and the interposer 16.

A suitable material for the dielectric material 32 is a UV-curable dielectric material, ELECTRODAG 1015, available from Acheson. However, it will be appreciated that a wide variety of other suitable materials may be used instead. The dielectric material 32 may have a thickness from about 5 microns to about 25 microns.

It will be appreciated that the dielectric material 32 may be configured as a single layer, or as multiple layers, pads, or areas of dielectric material. As another alternative, it may be possible to omit the dielectric material 32. The incidental contact between the antenna portion capacitive coupling elements 24a/24b and the interposer capacitive coupling elements 29a/29b may be insufficient to allow conductive coupling between them, so that the resulting device (even without the dielectric material 32) may still be a capacitively-coupled device.

As discussed in greater detail below, the capacitive coupling elements 24a/24b and 29a/29b and the dielectric material 32 may be selected and/or configured to provide the capacitive coupler 13 with desired operating characteristics.

It will be appreciated that the RFID device 10 may include additional layers and/or structures. For example, the RFID device 10 may include a web or sheet of material used to support and protect an RFID inlay stock that includes the antenna portion 14, and/or to provide usable form factors and surface properties (e.g. printability, adhesive anchorage, weatherability, cushioning, etc.) for specific applications. For example, a suitable top web or facestock layer for carrying printing may be utilized. Suitable materials for the facestock include, but are not limited to, metal foils, polymer films, paper, textiles, and combinations thereof. Textiles include woven and non-woven fabrics made of natural or synthetic fibers. The materials can be single-layered paper or film or they can be multi-layered constructions. The multi-layered constructions or multi-layered polymeric films can have two or more layers, which can be joined by coextrusion, lamination, or other processes. The layers of such multi-layered constructions or multi-layered polymeric films can have the same composition and/or size or can have different compositions or sizes.

Figure 3:
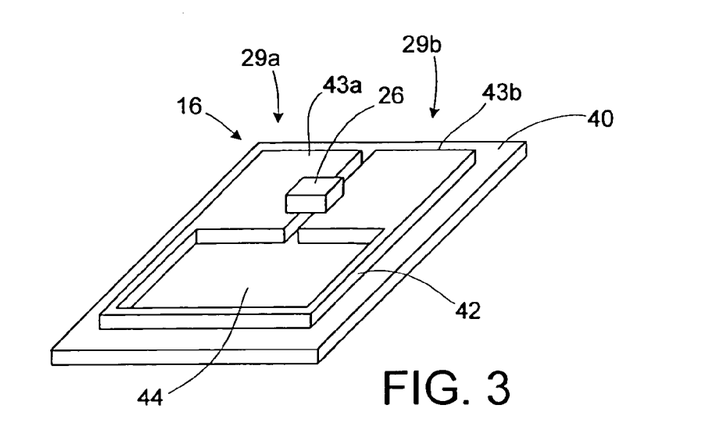
FIG. 3 is an oblique view of an interposer for use as part of the RFID device of FIG. 1.

Turning now to FIG. 3, details are given of one embodiment of the interposer 16. The interposer 16 includes an interposer substrate 40 upon which the interposer magnetic coupling element 28 and the interposer capacitive elements 29a and 29b, are located. The magnetic coupling element 28 is an interposer conductive loop 42 that is electrically coupled to the transponder chip 26. The interposer capacitive elements 29a and 29b are interposer conductive material areas 43a and 43b, which may in general have any of a variety of suitable shapes or configurations. The transponder chip 26 may be physically attached to the interposer substrate 40, and/or to the interposer conductive loop 42. The physical attachment may be an adhesive attachment, or may be by another suitable attachment method.

The conductive loop 42 substantially surrounds a non-conductive area 44. By substantially surrounding the non-conductive area 44, the conductive loop 42 is suitably capable of interacting with the antenna portion magnetic coupling element 22 (FIG. 1), so as to magnetically couple together the antenna 20 and the transponder chip 26.

The conductive loop 42 is shown in FIG. 3 as having a generally rectangular shape. This is only one example of a large variety of suitable shapes for the interposer conductive loop 42. The interposer conductive loop 42 may alternatively be generally circular, for example. The ends of the conductive loop 42 are electrically coupled to respective contacts of the transponder chip 26. It will be appreciated that this provides a short circuit between the contacts of the transponder chip 26. Short circuiting together the contacts may advantageously protect the transponder chip 26 from certain electrical events, such as from damage due to static electricity. The short circuiting provided by the conductive loop 42 prevents static electricity from imposing a large voltage difference across the two contacts of the transponder chip 26. Thus some types of damage to the transponder chip 26 may be avoided.

Examples of suitable materials for the interposer substrate 40 include, but are not limited to, high Tg polycarbonate, polyethylene terephthalate (PET), polyarylate, polysulfone, a norbornene copolymer, poly phenylsulfone, polyetherimide, polyethylenenaphthalate (PEN), polyethersulfone (PES), polycarbonate (PC), a phenolic resin, polyester, polyimide, polyetherester, polyetheramide, cellulose acetate, aliphatic polyurethanes, polyacrylonitrile, polytrifluoroethylenes, polyvinylidene fluorides, HDPEs, poly(methyl methacrylates), a cyclic or acyclic polyolefin, or paper.

The conductive loop 42 and the interposer conductive material areas 43a and 43b may be any of a wide variety of conductive materials, placed on the interposer substrate 40 in any of a variety of suitable ways. The conductive loop 42 and/or the interposer conductive material areas 43a and 43b may be formed of conductive ink printed on or otherwise deposited on the interposer substrate 40. Alternatively, the conductive loop 42 and/or the interposer conductive material areas 43a and 43b may be an etched conductive material that is adhesively or otherwise adhered to the interposer substrate 40. Other possible alternatives for formation of the conductive loop 42 and/or the interposer conductive material areas 43a and 43b include deposition methods such as vapor deposition or sputtering, and plating methods such as electroplating.

It will be appreciated that it would be desirable that the interposer conductive loop 42 and the interposer conductive material areas 43a and 43b be made of a material that has a low electrical resistance. The higher the resistance of the material, the more energy that is dissipated within the conductive material, and the lower the amount of energy that is forwarded to the transponder chip 26. Thus the conductive loop 42 at least may be configured such that its resistance is less than about 10% of the input impedance of the interposer 16.

The interposer conductive areas 43a and 43b, which function as the interposer capacitive elements 29a and 29b, may be substantially flat rectangular plates of conductive material. The area of the interposer conductive areas 43a and 43b may be from about 4 to 40 mm$^2$, for example. However, it will be appreciated that other suitable areas and/or shapes may be employed for the interposer conductive areas 43a and 43b.

Figure 4:
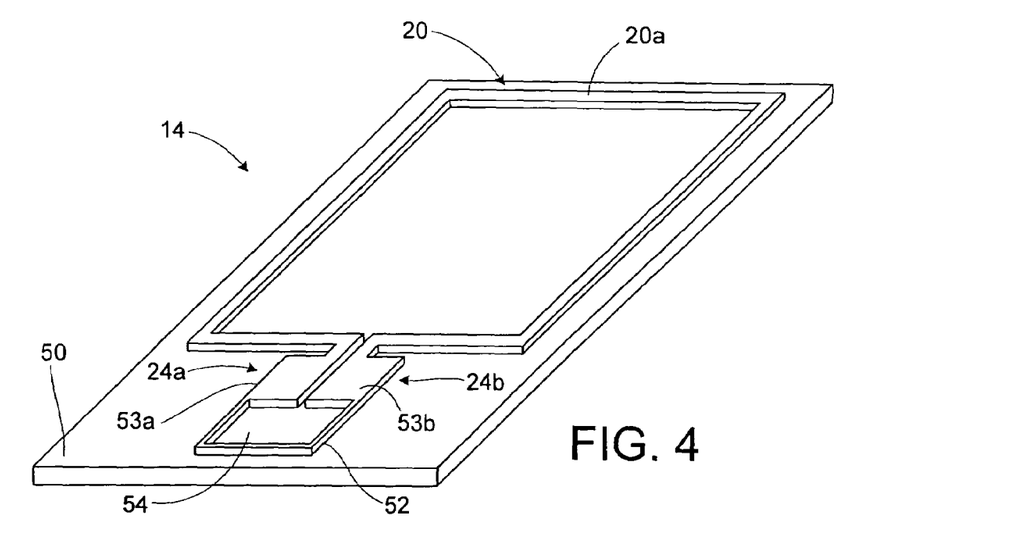
FIG. 4 is a plan view of an antenna portion for use with the RFID device of FIG. 1.

Turning now to FIG. 4, some details are shown of one configuration of the antenna portion 14. The antenna portion 14 includes an antenna substrate 50. The antenna 20, an antenna portion conductive loop 52, and antenna portion conductive material areas 53a and 53b (which serve as the capacitive elements 24a and 24b), are formed upon or attached to the antenna substrate 50. The antenna portion conductive loop 52 surrounds a non-conductive area 54. The antenna portion conductive loop 52 is configured to be the antenna portion magnetic coupling element 22 that couples to the interposer magnetic coupling element 28 (FIG. 1) as part of the magnetic coupler 12 (FIG. 1). The antenna portion conductive material areas 53a and 53b are capacitively coupled to the interposer conductive material areas 43a and 43b (FIG. 3) as part of the capacitive coupling 13. The antenna substrate 50 may be made of material similar to that of the interposer substrate 40 (FIG. 3). The antenna 20, the antenna portion conductive loop 52, and the conductive material areas 53a and 53b may be made of material and by methods similar to those described above with regard to the interposer conductive loop 42 (FIG. 3) and the conductive material areas 53a and 53b. The antenna 20, the antenna portion conductive loop 52, and the conductive material areas 53a and 53b, may be formed by the same process in a single step. Alternatively, the antenna 20, the conductive loop 52, and the conductive material areas 53a and 53b, may be formed in different steps and/or by different processes.

As shown in FIG. 4, the antenna 20 may be coupled to the antenna portion conductive loop 52 and the conductive material areas 53a and 53b by direct electrical coupling. It will be appreciated that the electrical coupling between the antenna 20 and either or both of the antenna portion coupling loop 52 and the conductive material areas 53a and 53b, may be made by other mechanisms such as capacitive coupling.

The antenna portion conductive loop 52 may have a size and shape similar to that of the interposer conductive loop 42 (FIG. 3). Alternatively the conductive loops 42 and 52 may have different suitable shapes. The range of suitable shapes for the antenna portion conductive loop 52 may be as broad as that for the interposer conductive loop 42.

Similarly, the antenna portion conductive material areas 53a and 53b may have sizes and shapes similar to those of the interposer conductive material areas 43a and 43b (FIG. 3). Alternatively the antenna portion conductive material areas 53a and 53b may have sizes and shapes different from those of the interposer conductive material areas 43a and 43b. The conductive material areas 43a/43b and 53a/53b may have simple geometric shapes, such as rectangles. Alternatively, the conductive material areas 43a/43b and 53a/53b may have more complicated shapes and/or relative orientations, some of which discussed further below.

Figure 5:
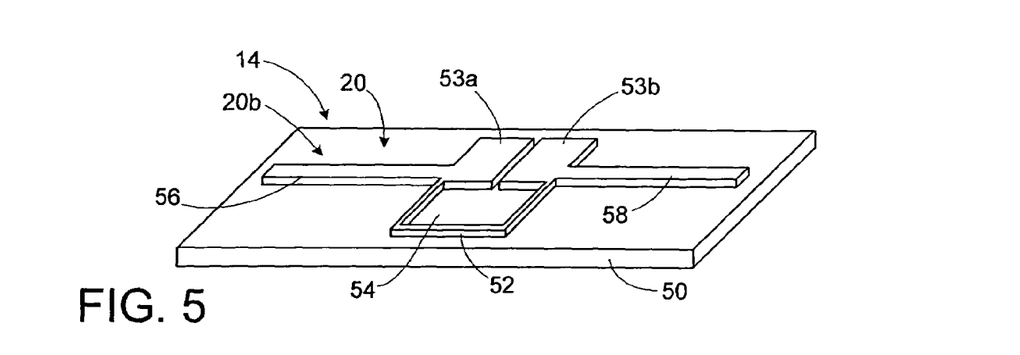
FIG. 5 is a plan view of part of an alternate embodiment antenna portion, which utilizes a dipole antenna.
Figure 6:
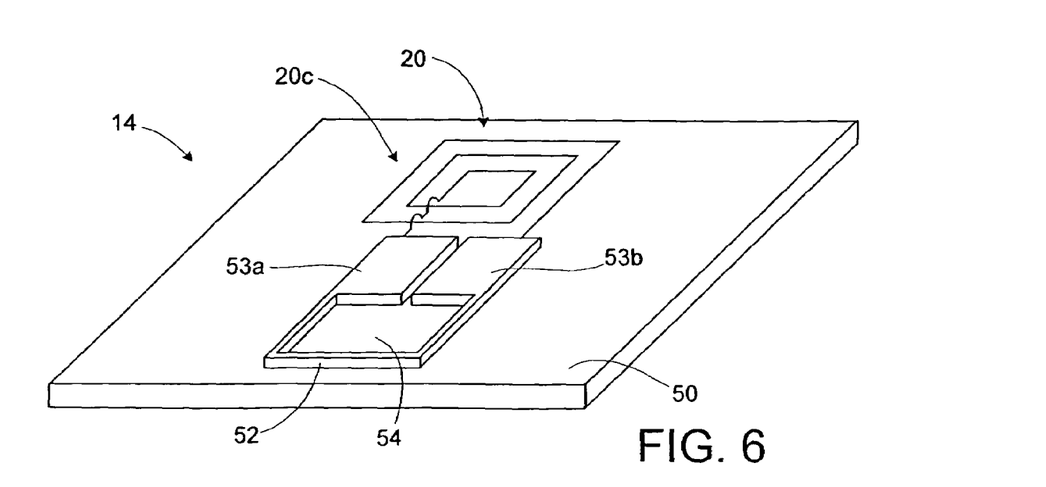
FIG. 6 is a plan view of part of another alternate embodiment antenna portion, which utilizes a spiral antenna.

The antenna 20 shown in FIG. 4 is a loop antenna 20a. It will be appreciated that many other suitable configurations are possible for the antenna 20. Examples of other suitable configurations include a dipole antenna 20b with antenna elements 56 and 58, shown in FIG. 5, and a spiral antenna 20c, shown in FIG. 6. Other types of suitable antennas include slot antennas, patch antennas, and various hybrid antenna types. The mechanism for generating the magnetic field in the magnetic coupler 12 (FIG. 1) may vary based on the antenna type or configuration.

The transponder chip 26 has been described above as a chip having two contacts that are coupled to the magnetic coupling element 28 and to the capacitive coupling elements 29a and 29b. It will be appreciated that suitable modifications may be made for transponder chips that require or utilize three or more conductive contacts, such as for achieving greater orientation and sensitivity.

Figure 7:
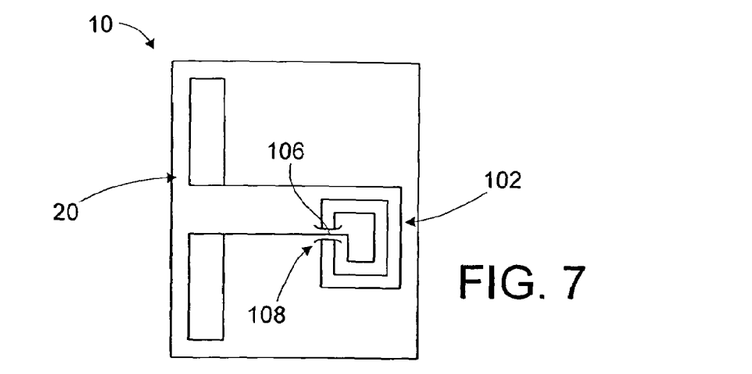
FIG. 7 is a plan view showing an antenna portion having a multi-turn conductive loop or coil, for use in an RFID device in accordance with the present invention.

The conductive loops 42 and 52 described above are single-turn loops. It will be appreciated that multi-turn coils or loops may be substituted for the single-turn loops described above, with suitable modification for creating direct coupling between the conductive loops and either the transponder chip 26 or the antenna 20. An example of such a multi-turn coil is the coil 102 shown in FIG. 7. The coil 102 has multiple turns one inside another in a generally spiral configuration, with a conductive shunt 106 provided across a non-conductive bridge 108, in order to enable direct electrical connection to either an antenna or a transponder chip. It will be appreciated that a multi-turn coil 102 may be constructed using multiple deposition steps for depositing first the main structure of the antenna 20, then the non-conductive shunt 106, and finally the conductive bridge 108.

It will be appreciated that a multi-turn coil may have any of a wide variety of configurations (e.g., shapes and sizes) and methods of construction. Coils with three of more turns or loops may be made with repetition of various suitable fabrication steps.

Figure 8:
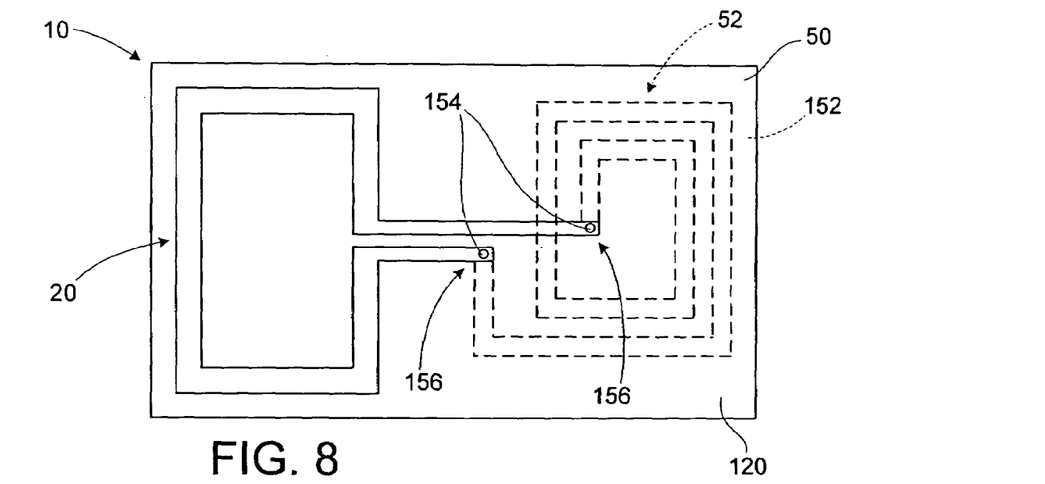
FIG. 8 is a plan view showing one embodiment of an antenna portion with a conductive element on one major face and an antenna on an opposite major face, with a direct electrical coupling between the two, for use in an RFID device in accordance with the present invention.
Figure 9:
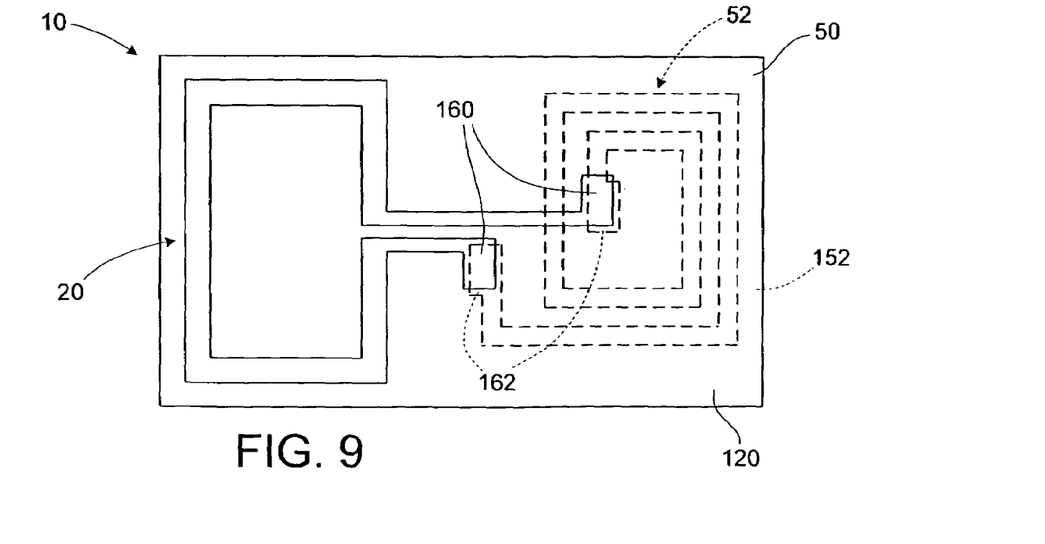
FIG. 9 is a plan view showing one embodiment of an antenna portion with a conductive element on one major face and an antenna on an opposite major face, with a capacitive coupling between the two, for use in an RFID device in accordance with the present invention.

FIGS. 8 and 9 show alternative configurations for the antenna portion 14, with the antenna 20 on one face or major surface 120 of the antenna substrate 50, and the antenna portion conductive loop or coil 52 on a second face or major surface 152 of the antenna substrate 50. In the configuration shown in FIG. 8, the antenna 20 and the antenna portion conductive loop 52 are directly electrically coupled through conductive material 154 in holes 156 in the substrate 50. The holes 156 may be formed by punching or other suitable processes. The punching or other suitable processes may be used to both create the holes 156 and to cause some of the conductive material of the antenna 20 or of the antenna portion conductive loop 52, to be pushed into the holes 156.

The antenna portion 14 in FIG. 9 relies upon capacitive coupling to electrically couple the antenna 20 to the antenna portion conductive loop 52, across the antenna substrate 50. To provide for an enhanced capacitive coupling, the antenna 20 may have a first pair of loop-antenna capacitive coupling elements 160 electrically coupled thereto, and the conductive loop 52 may have a second pair of corresponding loop-antenna capacitive coupling elements 162 coupled thereto. The loop-antenna capacitive coupling elements 160 and 162 may be areas of electrically conductive material that serve as plates of a pair of parallel plate capacitors, using material from the antenna substrate 50 as an intervening dielectric. Thus each of the loop-antenna capacitive coupling elements 160 may be capacitively coupled to a corresponding loop-antenna capacitive coupling element 162. The thickness and material of the antenna substrate 50 may be selected to obtain the desired capacitive coupling between the antenna 20 and the conductive loop 52.

It will be appreciated that a variety of suitable antenna configurations, and a variety of different configurations of conductive loops (single turn or multiple turn) may be utilized with the antenna portion 14 shown in FIGS. 8 and 9, and described above. Further, it will be appreciated that the general principle of directly or capacitively coupling across a substrate may be utilized in configuring the interposer 16. That is, it will be appreciated that an alternative configuration of the interposer 16 may involve placing the transponder chip 26 on one side of the interposer substrate 40, and placing the conductive loop 42 on the other side of the interposer substrate 40.

What follows now are further details regarding possible configurations of the capacitive coupling elements 24*a*/24*b* and 29*a*/29*b*, and the dielectric material 32. Some of the details described below may be found in co-owned U.S. application Ser. No. 10/871,136, filed Jun. 18, 2004, which is incorporated herein by reference in its entirety.

With regard to the characteristics of the dielectric material 32 (FIG. 1), the dielectric material 32 may include suitable dielectric adhesives or non-conductive polymers. Examples of suitable adhesives for the dielectric material 32 include pressure-sensitive adhesives such as Fasson adhesives S4800 and S333, available from Avery Dennison Corporation. Alternatives adhesives include thermoset non-conductive adhesives such as epoxies, and thermoplastic hot-melt adhesives. It will be appreciated, however, that other suitable materials may be used for the dielectric material 32. Examples of suitable non-conductive polymers include Emerson & Cuming 12873-47G, available from Emerson and Cuming, of Billerica, Mass., USA, and Dello MONOPOX MK045, available from Dello Industrial Adhesives, of Landsberg, Germany.

One way that the capacitance $X_c$ of the capacitive coupler 13 may be increased is by increasing the dielectric material 32. Various pressure-sensitive adhesives have been found to have dielectric constants ranging from about 2.5 to about 4.2. Increasing the dielectric constant may be accomplished by adding a high-dielectric material to a dielectric adhesive such as a dielectric pressure-sensitive adhesive or a non-conductive polymer. Examples of suitable additives include titanium compounds such as titanium dioxide (rutile crystal form) and barium titanate ($BaTiO_3$). Titanium dioxide has a dielectric constant of about 100 at 100 MHz. Barium titanate has a dielectric constant of 600 at 3 GHz. For example, it is estimated that adding 5% by volume of barium titanate to a pressure-sensitive adhesive increases the dielectric constant of the material from 3 to 33, while adding 10% by volume barium titanate increases the dielectric constant to 63. Similar or greater volume percentages of barium titanate may be included in the dielectric material 32.

The capacitive coupler 13 may involve pairs of capacitive coupling elements 24*a*/24*b* and 29*a*/29*b* that are ideal plates of the same size, parallel to and aligned with one another, and not having any edge effects due to the finite size of the plates. However, it will be appreciated that certain non-ideal situations may be encountered in actual practice.

For example, there may be misalignment of the antenna portion capacitive coupling elements 24*a* and 24*b*, relative to the interposer capacitive coupling elements 29*a* and 29*b*, so that the effective coupling area is affected. Such misalignment may involve relative displacements of the antenna portion capacitive coupling elements 24*a* and 24*b* and the interposer capacitive coupling elements 29*a* and 29*b* within their planes (x-y displacements), such that the interposer capacitive coupling elements 29*a* and 29*b* are not centered or located as desired relative to corresponding portions of the antenna portion capacitive coupling elements 24*a* and 24*b*. Another type of misalignment may involve the interposer capacitive coupling elements 29*a* and 29*b* being non-parallel relative to the corresponding portions of the antenna portion capacitive coupling elements 24*a* and 24*b* (angle misalignments within their planes).

Other difficulties may arise from non-uniformities in the thickness of the dielectric material 32. For example, where the dielectric material 32 is a pressure-sensitive adhesive layer or pads, variations in the force used to activate the adhesive may cause variations in the thickness of the layer or pads, both in terms of thickness variations within a single layer or pads, and in variations between different pads. It will be appreciated that it would desirable for such non-ideal conditions to be avoided or to be minimized within acceptable tolerances, and/or for the capacitive coupler 13 to be able to be to some degree self-compensating, so as to reduce the effect of non-ideal conditions.

Figure 10:
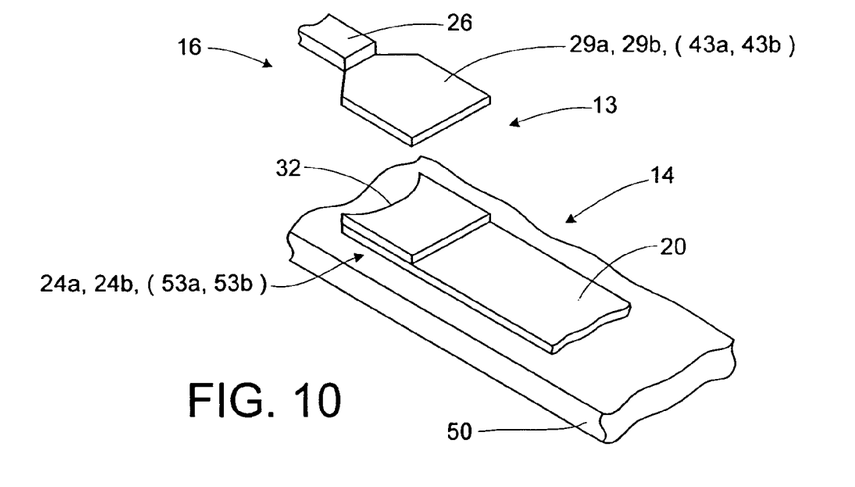
FIG. 10 is an oblique exploded view of part of one embodiment of the capacitive coupler of an RFID device in accordance with the present invention.

One way to reduce the effects of misalignment of the capacitive coupling elements 24*a*/24*b* and 29*a*/29*b* is to make some range of overlap between the two, so that precise alignment is not necessary. FIG. 10 shows an example of such an overlap, wherein the antenna portion capacitive coupling elements 24*a*/24*b* (the conductive areas 53*a*/53*b*) are larger than the interposer capacitive coupling elements 29*a*/29*b* (the conductive areas 43*a*/43*b*). The antenna portion capacitive coupling elements 24*a*/24*b* may have a rounded concave shape, which makes for reduced variation in the overlap area if there is angle misalignment of the interposer capacitive coupling elements 29*a*/29*b*.

Figure 11:
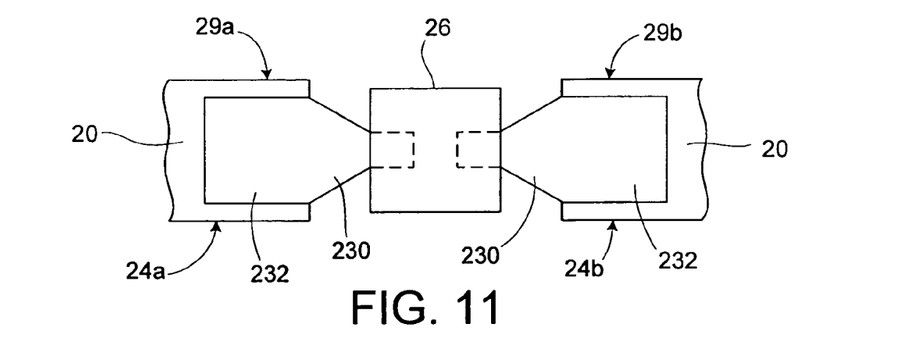
FIG. 11 is a plan view of another embodiment of a capacitive coupling of an RFID device in accordance with the present invention.
Figure 12:
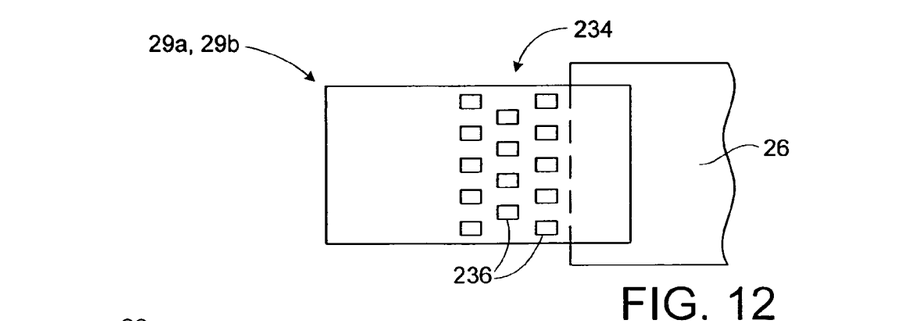
FIG. 12 is a bottom of part of an interposer of an RFID device in accordance with the present invention.

It will be appreciated that the interposer capacitive coupling elements 29*a*/29*b* may also be configured so as to reduce the effect of misalignment between the interposer capacitive coupling elements 29*a*/29*b* and the antenna portion capacitive coupling elements 24*a*/24*b*, on the effective coupling area A. FIGS. 11 and 12 show examples of various ways of configuring the interposer capacitive coupling elements 29*a*/29*b* to achieve this. In FIG. 11, the interposer capacitive coupling elements 29*a*/29*b* have tapered portions 230 with a non-uniform width, with the width in the tapered portions 230 being less than that in coupling portions 232 that are used to capacitively couple the interposer capacitive coupling elements 29*a*/29*b* to the antenna portion capacitive coupling elements 24*a*/24*b*. Misalignment of the interposer capacitive coupling elements 29*a*/29*b* in a left-right direction in FIG. 31 causes some change in the coupling capacitance, due to the decrease in coupling area for one of the interposer capacitive coupling elements 29*a*/29*b* and a increase in the coupling area for the other of the interposer capacitive coupling elements 29*a*/29*b*. However, the change in coupling areas will be less than if the interposer capacitive coupling elements 29*a*/29*b* had a uniform width along their length, since the tapered portions 230 have less width per unit length. Therefore, the inclusion of the tapered portions 230 reduces the effect of some types of angle misalignment on conductive coupling.

Another configuration for reducing effects of misalignment on the effective coupling area A is illustrated in FIG. 12, where the interposer capacitive coupling elements 29*a*/29*b* have reduced conductive material portions 234 which have openings, gaps, or apertures 236 in the conductive material. The effective coupling area are proportional, at least to a first approximation, to the overlapping area of the interposer capacitive coupling elements 29*a*/29*b* that are covered by conductive material. By omitting the conductive material from parts of the reduced conductive material portions 234, the effective area of those portions is reduced.

Therefore misalignment of the interposer 16 that brings the reduced conductive material portions 234 into coupling with the antenna portion capacitive coupling elements 24a/24b, has less of an effect on coupling capacitance than if the apertures 236 in the conductive material were not present. It will be appreciated that the apertures 236 may have any of a variety of suitable shapes, such as round, square, elliptical, or rectangular.

It will further also be appreciated that the configurations illustrated in FIGS. 11 and 12 may be characterized as having the common feature that portions of the interposer leads that are not normally coupled to the antenna portion capacitive coupling elements 24a/24b have a reduced effect area per unit length, when compared with portions of the interposer capacitive coupling elements 29a/29b that are normally capacitively coupled to the antenna portion capacitive coupling elements 24a/24b.

Figure 13:
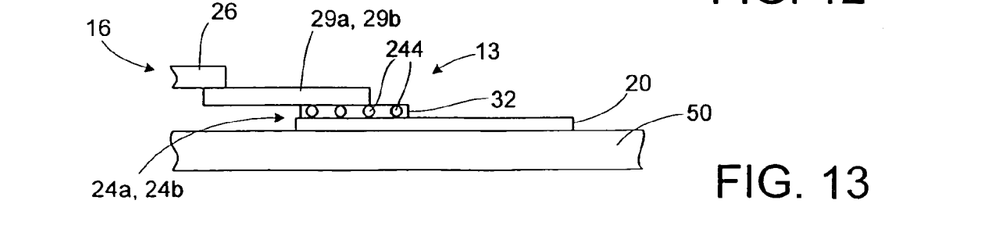
FIG. 13 is a cross-section side view of another embodiment capacitive coupling of an RFID device in accordance with the present invention.

FIG. 13 illustrates another variation of the capacitive coupler 13, with separation between the antenna portion capacitive coupling elements 24a/24b and the interposer capacitive coupling elements 29a/29b being maintained by spacers 244 that are part of the dielectric material 32. The spacers 244 may be utilized in the dielectric material 32 in conjunction with a non-conductive polymer. The spacers 244 may be pre-blended in the polymer material. Alternatively, the spacers may be dry-sprayed onto a non-conductive polymer that has already been applied to the antenna 20 and/or the interposer capacitive coupling elements 29a/29b. It will be appreciated that the spacers 244 may also be utilized in conjunction with other dielectric materials, such as pressure-sensitive adhesives. Examples of suitable spacers include Micropearl SP-205 5 μm spacers available from Sekisui Fine Chemical Co. of Japan, and 7.7 μm fiber spacers (Product 111413) available from Merck. It will be appreciated that using the spacers 244 may aid in obtaining accurate and consistent spacing between the antenna portion capacitive coupling elements 24a/24b and the interposer capacitive coupling elements 29a/29b of the RFID device 10.

It also may be possible for the dielectric material 32 to include a material that has an effective dielectric constant that varies as the thickness of the material varies. Thus the effective dielectric constant of the material would be non-constant, although it will still be referred to herein as a "constant." For example, the dielectric material 32 may include a material that reduces its dielectric constant as it is compressed. Thus if the material were to be made thinner, for example by a larger-than-normal force for pressing the interposer 16 onto the antenna 20, the material would have a reduced dielectric constant. This reduction in dielectric constant would mitigate to some extent the effect on the coupling capacitance $X_c$ of the reduction in thickness of the dielectric material. Thus use of a dielectric material that is at least to some extent self-compensating for thickness may aid in reducing variations in coupling capacitance $X_c$.

One way of having a dielectric material with a dielectric constant that is a function of thickness is to distribute particles within the dielectric material that affect the dielectric constant of the material. As the material is compressed, the particles are redistributed, causing a change in the dielectric constant of the material. For example conductive metal particles, such as aluminum or nickel particles, may be added to a dielectric material. As the material is compressed, the distance between the particles is reduced, thereby also reducing the dielectric constant. It will be appreciated that the addition of such particles, if done at small enough concentration, will not change the overall dielectric character of the material. That is, conductive particles may be suitably added without making the material itself electrically conducting. The particles may be in powder form, and may have any of a variety of suitable particle sizes, including sub-micron sizes.

It will also be appreciated that adding conductive particles to the dielectric material of the dielectric material 32 may also reduce the effective thickness of the dielectric material 32. That is, the conductive particles may cause the dielectric material 32 to effectively have a smaller thickness than their actual thicknesses. Oxidation on the surfaces of the particles may even prevent conductivity between particles, should the particles touch.

Other sorts of particles may be added to the dielectric material 32 to achieve any of a variety of effects on conductive coupling. Examples of materials for particles that may be added to the dielectric material 32 include mixtures of metal spheres and dielectric spheres, particles that include both metal and ceramic, and metal spheres with surfaces oxidized or otherwise converted to high dielectric materials (e.g., titanium particles oxidized to a given surface depth). Layers of metal and ceramic may also be employed.

Another way of having the capacitive coupler 13 compensate for thickness is to have an effective area, between the antenna portion capacitive coupling elements 24a/24b and the interposer capacitive coupling elements 29a/29b, that varies as a function of the separation of the antenna portion capacitive coupling elements 24a/24b and the interposer capacitive coupling elements 29a/29b (the thickness of the dielectric material 32). The effective area is defined herein as the equivalent parallel-plate capacitor area of an ideal parallel plate capacitor. The effective area may differ from the facing area of the antenna portion capacitive coupling elements 24a/24b and the interposer capacitive coupling elements 29a/29b because of fringing capacitance or edge effects, effects due to the antenna portion capacitive coupling elements 24a/24b and the interposer capacitive coupling elements 29a/29b not being infinite flat plates. The impact of fringing capacitance will depend on the separation between the antenna portion capacitive coupling elements 24a/24b and the interposer capacitive coupling elements 29a/29b (the thickness of the dielectric material 32). Decrease of the effective area as the antenna portion capacitive coupling elements 24a/24b and the interposer capacitive coupling elements 29a/29b are moved closer together aids in reducing variations in coupling capacitance $X_c$, as the thickness of the dielectric material 32 changes.

Figure 14:
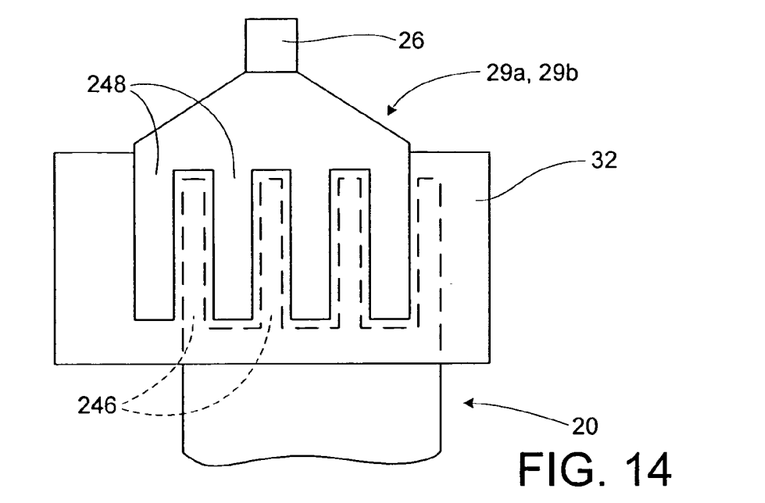
FIG. 14 is a plan view of yet another embodiment of a capacitive coupling of an RFID device in accordance with the present invention.
Figure 15:
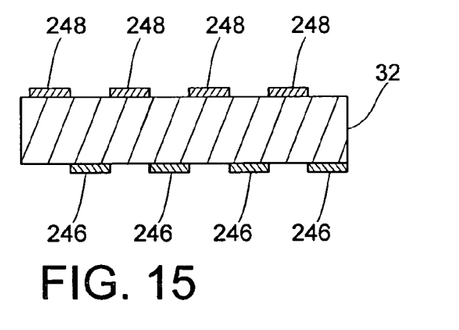
FIG. 15 is a cross-sectional side view of the capacitive coupling of FIG. 14, with a relatively thick dielectric pad.
Figure 16:
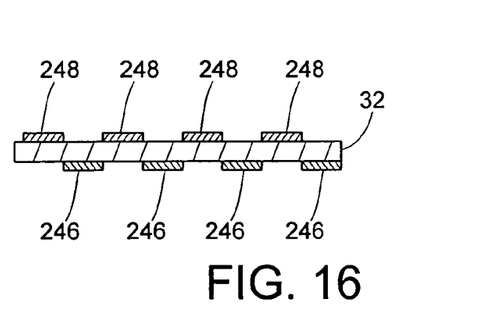
FIG. 16 is a cross-sectional side view of the capacitive coupling of FIG. 14, with a relatively thin dielectric pad.

FIG. 14 shows a plan view of one possible configuration with an effective coupling area that depends on thickness. The antenna portion capacitive coupling elements 24a/24b and the interposer capacitive coupling elements 29a/29b have respective interdigitated fingers 246 and 248 of conductive material, on respective opposite sides of the dielectric material 32. At relatively large thicknesses of the dielectric material 32, as illustrated in FIG. 15, the fingers 246 and 248 may interact with one another as parallel plate capacitors, with effective area approaching the actual area of the fingers 246 and 248. However, as the thickness of the dielectric material 32 is reduced, the effective area of the fingers 246 and 248 decreases, as the ratio of the thickness to the offset distance of the fingers 246 and 248 decreases. In the limit case, illustrated in FIG. 26, as the thickness of the dielectric material 32 is very much less than the offset distance of the fingers 246 and 248, there is only capacitive coupling of the edge regions of the fingers, and the effective area for purposes of capacitive coupling becomes a small percentage of the actual area of the fingers 246 and 248.

Thus, the effect of a reduction in dielectric thickness, which tends to raise the capacitance, is offset to at least some extent by the reduction of effective area of the capacitive coupling.

It will be appreciated that the configuration illustrated in FIGS. 14–16 and described above is but one of a variety of configurations that have reduced effective area of capacitive coupling as the thickness of a dielectric layer is reduced. Configurations that change effective capacitive coupling area as a function of thickness may be configurations that have portions of the antenna portion capacitive coupling elements 24a/24b and/or the interposer capacitive coupling elements 29a/29b that are on opposite sides of the dielectric material 32, but do not overlap directly with one another, although there may be some partial overlap of conductive material.

It will be appreciated that configurations described above with regard to the antenna portion capacitive coupling elements 24a/24b may be applicable as well to the interposer capacitive coupling elements 29a/29b, and vice versa.

As noted above coupling the transponder chip and the antenna by two different coupling methods (magnetic and capacitive) may lead to advantageous characteristics for the RFID device 10. The different coupling mechanisms may work better in different conditions, leading to improved overall performance of the RFID device 10. For example, the coupling mechanisms may have different sensitivities to different types of misalignment, leading to increased ability of the RFID device to operate even when misalignment between the interposer 16 and the antenna 20 exists. As another example, the different coupling mechanisms (capacitive and magnetic) may have different strengths and weaknesses with regard to incoming signals of different frequencies and amplitudes, with the combination producing an RFID device able to read a larger range of types of signals. As another example, the different coupling mechanisms may be affected differently by being placed near certain objects, such as by being placed near metal objects. It will be appreciated that these are only a few examples of the synergistic advantages possible by combining magnetic coupling and capacitive coupling in a single RFID device.

Figures 17, 18:
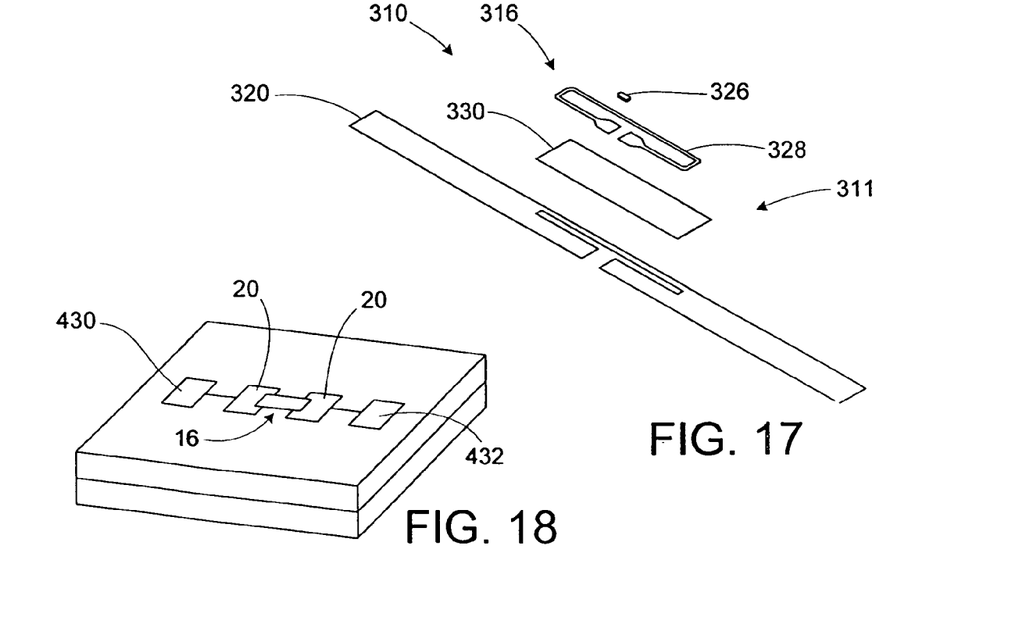
FIG. 17 is an exploded view of operative parts of a specific embodiment RFID device in accordance with the present invention.
FIG. 18 is an oblique view schematically illustrating an antenna with compensation elements, for use as a part of an RFID device in accordance with the present invention.

FIG. 17 shows operative parts of an RFID device 310. The RFID device 310 includes an antenna 320 and a chip 326 that are magnetically and capacitively coupled together via a coupling element 328, to form a combined reactive coupling 311. The coupling element 328 is a conductive material that is directly electrically coupled to contacts of the chip 326. The chip 326 and the coupling element 328 are parts of an interposer 316 that is adhesively attached to the antenna 320 by a pressure sensitive adhesive layer 330. The performance of the combined reactive coupling 311 has been found to relatively invariant to changes in thickness of the adhesive layer 330. In tests, the tuned frequency of the RFID device 310 showed only about 1% variance for various thicknesses of the adhesive layer ranging from 10 μm to 35 μm.

It will be appreciated that the environment into which the RFID device (or other RFID devices disclosed herein) is introduced may to some extent impact the operation of the magnetic coupler 12. For example, placement of the RFID device 10 on a metal surface or on a carton containing metallic and/or magnetic objects, may cause some influence on the operation of the magnetic coupler 12. The magnetic coupler 12 may be configured to compensate to some extent for the influence of the environment into which it is placed. The RFID device 10 may include any of a variety of suitable compensation features or elements to compensate at least to some extent for various types of material upon which the RFID device 10 may be mounted. Such compensation elements may: 1) introduce an impedance matching network between the chip and antenna which impedance matches the two, maximizing power transfer between the chip and the antenna; and/or 2) change the effective length of antenna elements so that the antenna stays at the resonant condition. Further details regarding compensation elements may be found in U.S. Provisional Patent Application No. 60/537,483, filed Jan. 20, 2004, which is incorporated herein by reference in its entirety.

The capacitive coupler 13 may also be affected by the dielectric properties of objects in its environment. In addition, the combined interaction the magnetic coupler 12 and the capacitive coupler 13 may compensate for the properties of objects in the environment into which the RFID device 10 is placed.

Further, the antenna 20 may have compensation features, such as those described in U.S. Provisional Patent Application No. 60/537,483, separate from and not directly associated with the couplers 12 and 13. These separate compensation elements of the antenna 20 may operate in conjunction with the couplers 12 and/or 13 to provide desirable response in a variety of environments. FIG. 18 schematically illustrates an antenna 20 with compensation elements 430 and 432.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. An RFID device comprising:
    a pair of components; and
    a combined reactive coupler electrically coupling together the components, wherein the combined reactive coupler includes:
        a magnetic coupler; and
        a capacitive coupler;
    wherein one of the components is on a substrate; and
    wherein the other of the components is on an interposer that is mechanically coupled to the substrate.

2. The device of claim 1,
    wherein the component on the substrate is an antenna, with the substrate and the antenna being parts of an antenna portion; and
    wherein the component on the interposer is a transponder chip.

3. The device of claim 2,
    wherein the magnetic coupler includes:
        an antenna portion magnetic coupling element electrically coupled to the antenna; and an interposer magnetic coupling element electrically coupled to the chip.

4. The device of claim 3,
wherein the antenna portion magnetic coupling element is an antenna portion conductive loop; and
wherein the interposer magnetic coupling element is an interposer conductive loop.

5. The device of claim 4, wherein the conductive loops are both single-turn loops.

6. The device of claim 4, wherein at least one of the conductive loops is a multi-turn coil.

7. The device of claim 6, wherein both of the conductive loops are multi-turn coils.

8. The device of claim 6, wherein the antenna portion conductive loop has a different number of turns than the interposer conductive loop, thereby making the magnetic coupler function as a transformer.

9. The device of claim 4, wherein the interposer conductive loop is directly electrically coupled to contacts of the chip.

10. The device of claim 9, wherein the interposer conductive loop provides a short circuit between the contacts of the chip.

11. The device of claim 4, wherein the antenna portion conductive loop is directly electrically coupled to the antenna.

12. The device of claim 11, wherein the antenna and the antenna portion conductive loop are a single structure made in a single process operation.

13. The device of claim 4, wherein the antenna portion conductive loop is capacitively coupled to contacts of the chip.

14. The device of claim 3, wherein the magnetic coupler includes a high permeability material operatively coupled to the magnetic coupling elements.

15. The device of claim 14, wherein the high permeability material is located at least in part in between the magnetic coupling elements.

16. The device of claim 14, wherein the high permeability material includes a ferrite.

17. The device of claim 14, wherein the high permeability material is part of an adhesive layer adhesively coupling the antenna portion and the interposer.

18. The device of claim 14, wherein the high permeability material is part of a coating covering the antenna portion magnetic coupling element.

19. The device of claim 14, wherein the high permeability material is part of a coating covering the interposer magnetic coupling element.

20. The device of claim 3, wherein the magnetic coupler compensates for effects of nearby objects on operation of the magnetic coupler.

21. The device of claim 20, wherein the antenna portion magnetic coupling element and the interposer magnetic coupling element cooperatively interact to compensate for effects of nearby objects on operation of the magnetic coupler.

22. The device of claim 2, wherein the capacitive coupler includes:
an antenna portion pair of capacitive coupling elements that are electrically coupled to the antenna;
an interposer pair of capacitive coupling elements that are electrically coupled to the transponder chip; and
a dielectric material between the pairs of capacitive coupling elements.

23. The device of claim 22, wherein the capacitive coupling elements each include areas of conductive material.

24. The device of claim 22, wherein the dielectric material includes an adhesive between the pairs of capacitive coupling elements.

25. The device of claim 22, wherein the capacitive coupler compensates for effects of nearby objects on operation of the capacitive coupler.

26. The device of claim 25, wherein the antenna portion capacitive coupling elements and the interposer capacitive coupling elements cooperatively interact to compensate for effects of nearby objects on operation of the capacitive coupler.

27. The device of claim 22, wherein the magnetic coupler compensates for effects of nearby objects on operation of the magnetic coupler.

28. The device of claim 2, wherein the antenna includes compensation elements.

29. The device of claim 1, wherein the magnetic coupler and the capacitive coupler each transmit at least 10% of the energy transmitted between the components.

30. An RFID device comprising:
a pair of components; and
a combined reactive coupler electrically coupling together the components, wherein the combined reactive coupler includes:
a magnetic coupler; and
a capacitive coupler;
wherein the device further comprises an adhesive layer between the components.

31. The device of claim 30, wherein the components include a chip and an antenna.

32. The device of claim 31, wherein the adhesive layer includes a pressure sensitive adhesive.

33. The device of claim 31, wherein the reactive coupler is relatively invariant to thickness of the adhesive layer.

34. The device of claim 33, wherein tuning frequency of the reactive coupler has less than about 1% variance for variations in thickness of the adhesive layer from 10 µm to 35 µm.

35. An RFID device comprising:
an antenna portion that includes an antenna substrate, and an antenna on the antenna substrate;
an interposer mechanically coupled to the antenna portion, wherein the interposer includes a transponder chip; and
a combined reactive coupler electrically coupling together the antenna and the transponder chip, wherein the combined reactive coupler includes:
a magnetic coupler; and
a capacitive coupler;
wherein the magnetic coupler includes:
an antenna portion magnetic coupling element electrically coupled to the antenna; and
an interposer magnetic coupling element electrically coupled to the chip; and
wherein the capacitive coupler includes:
an antenna portion pair of capacitive coupling elements that are electrically coupled to the antenna;
an interposer pair of capacitive coupling elements that are electrically coupled to the transponder chip; and
a dielectric material between the pairs of capacitive coupling elements.

* * * * *